US007912564B2

(12) United States Patent
Aiso et al.

(10) Patent No.: US 7,912,564 B2
(45) Date of Patent: Mar. 22, 2011

(54) DIGITAL MIXING SYSTEM WITH DOUBLE ARRANGEMENT FOR FAIL SAFE

(75) Inventors: Masaru Aiso, Hamamatsu (JP); Takamitsu Aoki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1881 days.

(21) Appl. No.: 10/244,942

(22) Filed: Sep. 17, 2002

(65) Prior Publication Data

US 2003/0055518 A1 Mar. 20, 2003

(30) Foreign Application Priority Data

Sep. 19, 2001 (JP) ................................ 2001-285981

(51) Int. Cl.
*G06F 17/00* (2006.01)

(52) U.S. Cl. ......................................... 700/94; 381/119

(58) Field of Classification Search .................. 381/119; 700/94

See application file for complete search history.

(56) References Cited

U.S. PATENT DOCUMENTS

| | | | | |
|---|---|---|---|---|
| 5,088,021 | A | 2/1992 | McLaughlin et al. | |
| 5,396,618 | A | 3/1995 | Fukui et al. | |
| 5,402,501 | A | 3/1995 | Silfvajt et al. | |
| 5,940,521 | A * | 8/1999 | East et al. | 381/119 |
| 6,061,458 | A | 5/2000 | East et al. | |
| 6,218,971 | B1 * | 4/2001 | Sugihara | 341/110 |
| 6,351,829 | B1 * | 2/2002 | Dupont et al. | 714/48 |
| 6,556,583 | B1 * | 4/2003 | Hayashi et al. | 370/463 |
| 7,006,642 | B1 * | 2/2006 | Kumai | 381/119 |
| 2002/0082732 | A1 * | 6/2002 | Suyama et al. | 700/94 |
| 2008/0307249 | A1 | 12/2008 | Aiso et al. | |

FOREIGN PATENT DOCUMENTS

| | | |
|---|---|---|
| JP | 59036435 | 2/1984 |
| JP | HO2-288514 | 11/1990 |
| JP | 06-022398 | 1/1994 |
| JP | 06-119015 | 4/1994 |
| JP | 06-269100 | 9/1994 |
| JP | 11-317063 | 11/1999 |
| JP | 2000-181719 | 6/2000 |
| JP | 2000-197034 | 7/2000 |
| JP | 2000-217199 | 8/2000 |

(Continued)

OTHER PUBLICATIONS

Roland VM-C7200/C7100 Owners Manual, 1999, Roland Corporation, 312 pages.*

(Continued)

*Primary Examiner* — Vivian Chin
*Assistant Examiner* — Joseph Saunders, Jr.
(74) *Attorney, Agent, or Firm* — Morrison & Foerster LLP

(57) ABSTRACT

A digital mixing system has a console having a display and an operator for transmitting and receiving a control signal, an engine having input channels and output channels for mixing a plurality of audio signals fed from the input channels while exchanging the control signal with the console and feeding the mixed audio signals to the output channels, and peripheral input and output units connected to the input and output channels of the engine, respectively. The console and the engine are located remotely from each other, and a cable connecting therebetween is duplicated for the purpose of fail safe. The engine may be installed in pair. If a main engine fails, a sub engine backs up instantly to continue the mixing operation. The console may be also prepared in pair for the purpose of fail safe.

6 Claims, 11 Drawing Sheets

FOREIGN PATENT DOCUMENTS

| | | |
|---|---|---|
| JP | 2000-217200 | 8/2000 |
| JP | 2000-311087 | 11/2000 |
| JP | 2000-347674 | 12/2000 |

OTHER PUBLICATIONS

Compulite Ovation 4D/Micron 4D Remote Control Unit & BackUp, Aug. 1999, Compulite R&D, Documentation version 1.0, 19 pages.*

User Guide Entitled: "Ovation 4D/Micron 4D Remote Control Unit & BackUp"; Documentation Version 2.0; May 2002; www.compulite.com/literature/users-guides.

User Guide Entitled: "User Guide for E-Mix & E-Mix 2"; Documentation Version 1.2; Mar. 2002; www.compulite.com/literature/users-guides.

Compulite systems, Ltd. (2000). User Guide Entitled: "Compulite Ethernet Network—The Power of Connectivity", four pages.

Anonymous. (Oct. 1, 2000). The Mix 2000 AES New Products Guide, Mix Professional Audio and Music Production, located at <http://mixonline.com/mag/audio_mix_aes_new_13/index.html>, 5 pages.

Euphonix, Inc. (Oct. 1999). DF64 Digital Frame Manual, Euphonix High Performance Audio Systems, Version 1.0, Part #840-07523-01, Revision B, 14 pages.

Euphonix, Inc. (2001). Euphonix System 5: Supplement to the Digital Audio Mixing System Operation Manual, Version 2.0, Part No. 840-7994-01, Addendum-S5 OP-V2 RevA, 48 pages.

* cited by examiner

DIGITAL MIXING SYSTEM WITH DOUBLE ARRANGEMENT FOR FAIL SAFE

BACKGROUND OF THE INVENTION

1. Field of the Invention

The present invention relates to a system of a digital mixer which provides centralized control of acoustic facilities equipped in a hall for performing concerts and music plays.

2. Prior Art

Conventionally, there is known a mixer apparatus for controlling acoustic facilities at a hall for concerts and plays. The acoustic facility installed at such a hall uses a number of microphones and speakers, and provides various effect sounds. The mixer apparatus centrally controls how to mix many inputs from the microphones, how to apply effects to the mixed inputs, and which speakers to use for outputting the mixed results.

On a conventional and typical system of digital mixer, a console is separated from an engine. The console is installed on the operator side. The engine is installed on the player side. A cable is used for connection between the console and the engine. Since the console is separated from the engine, it is possible to provide a very short wiring path for collecting and mixing the player's performance on the engine and for returning the mixed results to the output sound system disposed in the vicinity of the player.

As will be described below, however, the above-mentioned digital mixer having the console and the engine separated from each other provides no countermeasures against an error, failure and malfunction, which may incidentally occur on the mixer. First, an error may occur on electrical connection lines involving connectors and cables and extending between the console and the engine. Second, another error may occur along connection lines including connectors and cables between the engine and input/output units. According to the practical arrangement, however, a distance between the console and the engine is often longer than a distance between the engine and the input/output unit. There is a high possibility of disconnection between the console and the engine. Third, the engine itself may incidentally suffer from an error or malfunction.

The digital mixer is used and installed in various sites such as a live stage, a recording studio and an event hall. In any case, a failure of the mixing must be avoided during the course of the music performance. Especially for the professional use, any failure at site is never permitted. If such a failure occurs, a normal operation state must be restored quickly in a very short time.

SUMMARY OF THE INVENTION

The present invention has been made in consideration of the foregoing. It is therefore an object of the present invention to provide a digital mixer which has a console and an engine separated from each other and which can continue a normal operation and ensure a fail-safe operation even if various errors might occur in an installation site.

In order to achieve the object of the invention, a digital mixing system comprises a console having a display and an operator for transmitting and receiving a control signal, and an engine having input channels and output channels for mixing a plurality of audio signals fed from the input channels while exchanging the control signal with the console and feeding the mixed audio signals to the output channels, wherein the console has a pair of connection terminals for communication with the engine, and the engine has a pair of connection terminals for communication with the console, and wherein a pair of cables are connected in parallel to each other between the connection terminals of the console and the connection terminals of the engine, such that the console and the engine use one of the cables for exchanging the control signal, and alternatively use the other of the cables if a communication failure occurs in said one cable so as to maintain the communication.

Preferably, the digital mixing system further comprises a detector that causes the console and the engine to periodically exchange a signal therebetween through said one cable and that detects the communication failure when either of the console and the engine does not receive the signal over a predetermined period.

Further, an inventive digital mixing system comprises a console having a display and an operator for transmitting and receiving sound data, and an engine having input channels and output channels for mixing a plurality of audio signals fed from the input channels while exchanging the sound data associated to the audio signals with the console and feeding the mixed audio signals to the output channels, wherein the console has a pair of connection terminals for communication with the engine, and the engine has a pair of connection terminals for communication with the console, and wherein a pair of cables are connected in parallel to each other between the connection terminals of the console and the connection terminals of the engine, such that the console and the engine use one of the cables for exchanging the sound data, and alternatively use the other of the cables if a communication failure occurs in said one cable so as to maintain the communication.

Preferably, in the digital mixing system, the console and the engine transmit and receive a word clock signal through said one cable for synchronization between the console and the engine in a multiplexing manner with the sound data, and the digital mixing system further comprises a detector that detects the communication failure when the word clock signal discontinues between the console and the engine.

Further, an inventive digital mixing system comprises a console having a display and an operator for transmitting and receiving control data and sound data, and first and second engines each having input channels and output channels for conducting a mixing operation of audio signals fed from the input channels while exchanging the control data of the mixing operation and the sound data of the audio signals with the console and feeding the audio signals after the mixing operation to the output channels, wherein the console comprises a first set of connection terminals for communication with the first engine to transmit and receive the control data and the sound data with respect to the first engine, a second set of connection terminals for communication with the second engine to transmit and receive the control data and the sound data with respect to the second engine, a control section that transmits the control data concurrently to both of the first engine and the second engine to enable the first engine and the second engine to conduct the same mixing operation in parallel to each other, and a switch section that normally operates to enable the first engine to feed the audio signals to the output channels subjected to the mixing operation, and that operates when the first engine suffers from a malfunction for switching to the second engine and enabling the second engine to feed the audio signals to the output channels subjected to the mixing operation.

Further, an inventive digital mixing system comprises a console having a display and an operator for transmitting and receiving a control signal, first and second engines each having input channels and output channels for conducting a mixing operation of audio signals fed from the input channels while exchanging the control signal with the console and feeding the audio signals after the mixing operation to the output channels, and at least one input unit for inputting the audio signals to the first and second engines, wherein the input unit has a first set of output terminals for connection with input terminals of the first engine so as to input the audio signals to the first engine through the input channels thereof, and a second set of output terminals for connection with input terminals of the second engine so as to input the same audio signals to the second engine through the input channels thereof in parallel to the first engine, and wherein the console has a control section that transmits the control signal concurrently to both of the first engine and the second engine to enable the first engine and the second engine to conduct the same mixing operation of the same audio signals inputted from the input unit in parallel manner, and a selector section that designates one of the first and second engines to effectuate the mixing operation and places the other of the first and second engines in a backup of the designated one of the first and second engines.

Further, an inventive digital mixing system comprises a console having a display and an operator for transmitting and receiving a control signal, first and second engines each having input channels and output channels for conducting a mixing operation of audio signals fed from the input channels while exchanging the control signal with the console and feeding the audio signals after the mixing operation to the output channels, and at least one output unit for outputting the audio signals fed from the first and second engines, wherein the output unit has a first set of input terminals for connection with output terminals of the first engine so as to receive the audio signals from the first engine through the output channels thereof, and a second set of input terminals for connection with output terminals of the second engine so as to receive the same audio signals from the second engine through the output channels thereof in parallel to the first engine, and wherein the console has a control section that transmits the control signal concurrently to both of the first engine and the second engine to enable the first engine and the second engine to conduct the same mixing operation of the audio signals, and a selector section that designates one of the first and second engines so as to allow the designated one to actually feed the audio signals after the mixing operation to the output unit and blocks the other one of the first and second engines from the output unit so as to place the other one in a backup of the designated one of the first and second engines.

Preferably, the output unit has an display device that indicates when the console switches the designating between the first engine and the second engine.

Further, an inventive digital mixing system comprises a pair of consoles being connected to each other and each having a display and an operator for transmitting a control signal by an operation of the operator, and an engine having input channels and output channels for mixing audio signals fed from the input channels in response to the control signal and feeding the mixed audio signals to the output channels, wherein the engine has a connection to the pair of the consoles such that the engine can receive the control signal from the respective console through the connection upon the operation of the operator equipped in the respective console, and such that the operation conducted by one of the consoles can be reflected back to the other of the consoles through the connection, and the engine normally operates to receive the control signal from one of the consoles for mixing the audio signals and operates when said one console suffers from a malfunction for switching to the other of the consoles so as to receive therefrom the control signal, thereby continuing the mixing of the audio signals.

Further, an inventive digital mixing system comprises a section that indicates a state of connection among members of the digital mixing system including one or more of consoles, one or more of engines and plurality of input and output units, such that each of the members recognizes the indicated state of connection and can operate in consistent with the recognized state of connection.

DETAILED DESCRIPTION OF THE INVENTION

An embodiment of the present invention will be described in further detail with reference to the accompanying drawings.

Figure 1:
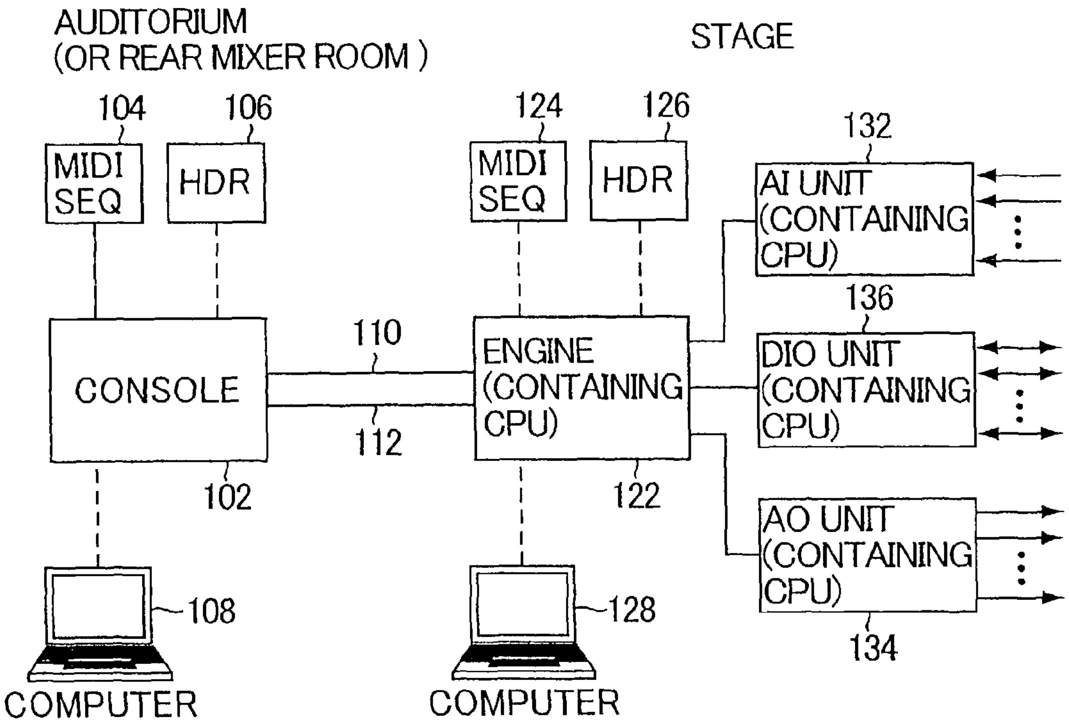
FIG. 1 shows an overall digital mixer system according to the present invention.

FIG. 1 shows an overall system of a digital mixer according to the present invention. The system basically comprises a console 102 and an engine 122. The console 102 is installed in an auditorium or a mixer room located rear side thereof. The engine 122 is installed on a stage. The engine 122 connects with an AI unit 132, an AO unit 134, and a DIO unit 136. The AI unit 132 is an analog input box capable of mounting up to eight analog/digital (A/D) conversion cards per unit. The A/D conversion card to be mounted is used for microphone signal input or line signal input. The card for microphone signal input is capable of 2-channel input per card. The card for line signal input is capable of 4-channel input per card. The AO unit 134 is an analog output box capable of mounting up to eight digital/analog (D/A) conversion cards per unit. One DA conversion card is capable of outputs equivalent to four channels. The DIO unit 136 is a digital IO box capable of mounting up to eight digital input/output (I/O) cards per unit. One digital I/O card is capable of inputs equivalent to eight channels (using two lines) and outputs equivalent to eight channels.

One engine can connect with up to ten input units including units 132 through 134 and up to six output units including units 134 through 136. The unit 136 is equivalent to one input unit and one output unit. At the design stage, it is possible to freely specify types and the number of units that can be connected to one engine. Design considerations also allow for any specification about how many input units and output units should be replaced by an input/output unit like the DIO unit 136.

The engine 122 appropriately mixes a microphone signal input and a line signal input from the above-mentioned units and outputs a mixed signal via these units. The console 102 provides control to determine details of mixing audio signals fed from input channels and fed to output channels. The console 102 is provided with a plurality of operation devices and display devices and is connected to the engine 122 via a control signal line 110 and a sound signal line 112.

The console 102 is provided with a MIDI terminal capable of connecting with a MIDI sequencer 104. The console 102 can be connected to a computer 108 which can control the console 102. Likewise, the engine 122 is provided with a MIDI terminal for connection with MIDI devices such as a MIDI sequencer 124, for example. The engine 122 can be connected to a computer 128 which can control the engine 122.

The console 102 and the engine 122 each include a terminal for exchanging a word clock with an external device, allowing connection with a clock generator 106 or 126. The word clock enables various synchronization operations. The word clock is a signal which specifies a sampling cycle for sound signals processed in the system. When the word clock is input to the console, then the word clock is transmitted to the engine from the console, and further to each input/output unit from the engine. When the word clock is initially input to the engine, the word clock is then transmitted to the console from the engine, and also to each input/output unit from the engine. When no word clock is supplied to the console or the engine, for example, the engine internally generates a word clock and sends it to the console or each input/output unit.

The control signal line 110 and the sound signal line 112 connect the console 102 and the engine 122. Each line is duplicated. The console 102 has two connection terminals for control signal lines. Likewise, the engine 122 has two connection terminals for sound signal lines. Two cables connect these terminals to configure the control signal line 110. When one cable causes an error, the other cable can be used for signal transmission, thereby providing a fail-safe operation. Similarly, the sound signal line 112 is also duplicated. The lines 110 and 112 connect the single console 102 and the single engine 122. When these lines are assumed to be one set, the console has two sets of input/output terminals for connection with two engines 122. The console 102 includes a cascade connection terminal (not shown) for connection with a second console. Likewise, the engine 122 also includes a cascade connection terminal for cascade connection with a second engine. Forms of connections between the console and the engine will be described in more detail.

Figure 2:
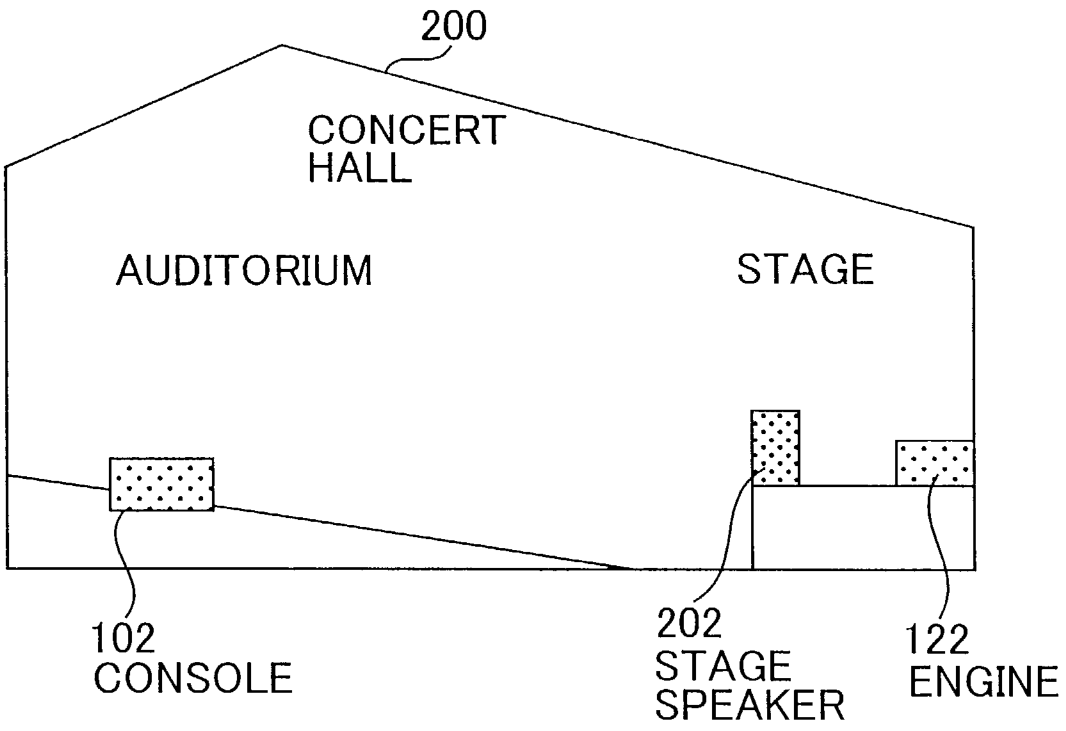
FIG. 2 shows an example of arranging a console and an engine.

FIG. 2 shows an example of arranging the console and the engine. The console is installed in an auditorium of a concert hall 200. There are arranged the engine 122 and a stage speaker 202 on the stage.

Figure 3:
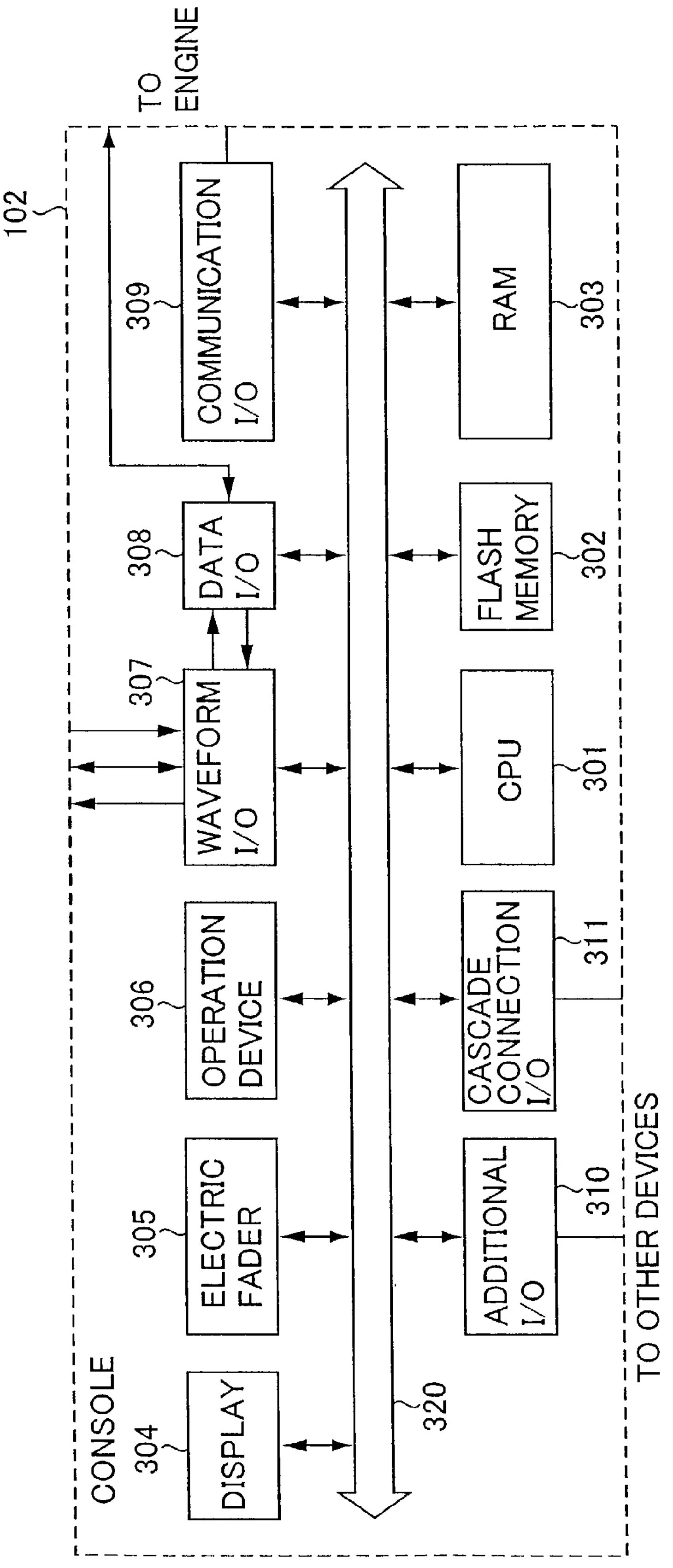
FIG. 3 is a block diagram showing an internal configuration of the console.

FIG. 3 is a block diagram showing an internal configuration of the console 102. The console 102 comprises a central processing unit (CPU) 301, flash memory 302, random access memory (RAM) 303, a display 304, an electric fader 305, an operation device 306, a waveform input/output interface 307, a data input/output interface 308, a communication input/output interface 309, and a bus line 320.

The CPU 301 controls an overall operation of the console 102. The flash memory 302 stores a control program that the CPU 301 executes. The RAM 303 is used as a work area for the CPU 301 to execute a program. The display device 304 displays various types of information for notification to an operator. The electric fader is a so-called moving fader equipped with a motor. The CPU 301 can detect a position of the fader 305. The fader 305 can be moved to a position specified by an instruction from the CPU 301. An operator uses various operation devices 306 for issuing instructions to the digital mixer.

The waveform I/O 307 is a sound signal input/output interface. The data I/O 308 is an interface for various digital data transmitted to and from the engine 122 and is connected to the sound signal line 112 in FIG. 1. The communication I/O 309 is an interface for serial data transmitted to and from the engine 122 and is connected to the control signal line 110 in FIG. 1. An additional I/O 310 is an interface for connection to other devices and is used as a terminal for connection to the computer shown in FIG. 1, etc.

A cascade connection I/O 311 is an interface for cascade connection to another console. More specifically, the cascade connection I/O 311 comprises a cascade-out terminal and a cascade-in terminal. The cascade-out terminal is used for connection with another console's cascade-in terminal. The cascade-in terminal is used for connection with another console's cascade-out terminal. There are provided two cascade-in terminals and two cascade-out terminals for duplicated connection. The bus line 320 connects these parts to each other.

One console 102 has a total of four sound signal terminals for connection to the sound signal line 112 and a total of four control terminals for connection to the control signal line 110. This configuration provides four systems redundantly as described with reference to FIG. 1. In consideration of safety, there are provided four data I/O circuits (double of two systems) for sound signals and four communication I/O circuits (double of two systems) for control signals instead of simply connecting the same signal lines parallel. Though not shown in the internal configuration diagram, safety is ensured by allowing one I/O circuit to correspond to one input/output terminal in each device. Consequently, up to two engines can be connected to one console 102. The two connected engines can process different channels for increasing the number of channels or otherwise processing the same channel for mirroring. In the case of mirroring, an operator can specify either of the two engines to be a master by manipulating the operation devices on the console. It may be also preferable to automatically select one engine to be a master by detecting a connection state among the console, the engines, and the peripheral units. Further, one console can be cascaded to another. These connection forms will be described later in detail.

Figure 4:
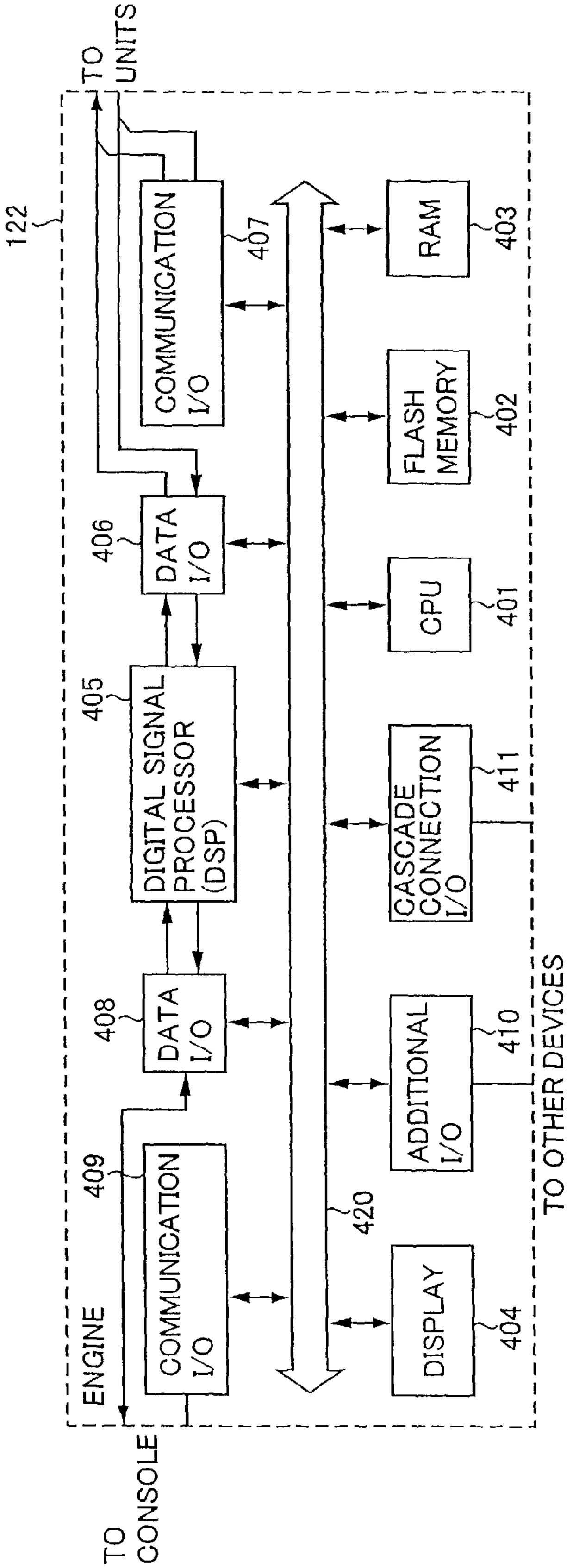
FIG. 4 is a block diagram showing an internal configuration of the engine.

FIG. 4 is a block diagram showing an internal configuration of the engine 122. The engine 122 comprises a CPU 401, flash memory 402, RAM 403, a display device 404, a signal processing section (digital signal processor: DSP) 40, a data I/O 406, a communication I/O 407, a data I/O 408, a communication I/O 409, an additional I/O 410, a cascade connection I/O 411, and a bus line 420.

The CPU 401 controls an overall operation of the engine 122. The flash memory 402 stores a control program that the CPU 401 executes. The RAM 403 is used as a work area for the CPU 401 to execute a program. The display device 404 displays an operating situation of the engine 122. The signal processing section 405 performs mixing operation to be described later in FIG. 6. The data I/O 406 and the communication I/O 407 are interfaces for connection with various I/O units to exchange digital and serial data. These interfaces are used as terminals for connection with the units 132, 134, and 136 in FIG. 1. The data I/O 408 is an interface with the console 102 for exchanging various digital data and is connected to the sound signal line 112 shown in FIG. 1. The communication I/O 409 is an interface with the console 102 for exchanging serial data and is connected to the control signal line 110 in FIG. 1. The additional I/O 410 is an interface for connection with other devices and is used as a terminal for connection with the computer as shown in FIG. 1.

The cascade connection I/O 411 is an interface for cascade connection with another engine. More specifically, the cascade connection I/O 411 comprises a cascade-out terminal and a cascade-in terminal. The cascade-out terminal is used for connection with another console's cascade-in terminal. The cascade-in terminal is used for connection with another console's cascade-out terminal. There are provided two cascade-in terminals and two cascade-out terminals for duplicated connection. The bus line 420 connects these parts to each other.

One engine 122 has a total of two sound signal terminals for connection to the sound signal line 112 and a total of two control terminals for connection to the control signal line 110. This configuration aims at one duplicated system as described with reference to FIG. 1. The configuration allows one console 102 to be connected to one engine 122. Further, one engine can be cascaded to another. These connection forms will be described later in detail.

Figure 5:
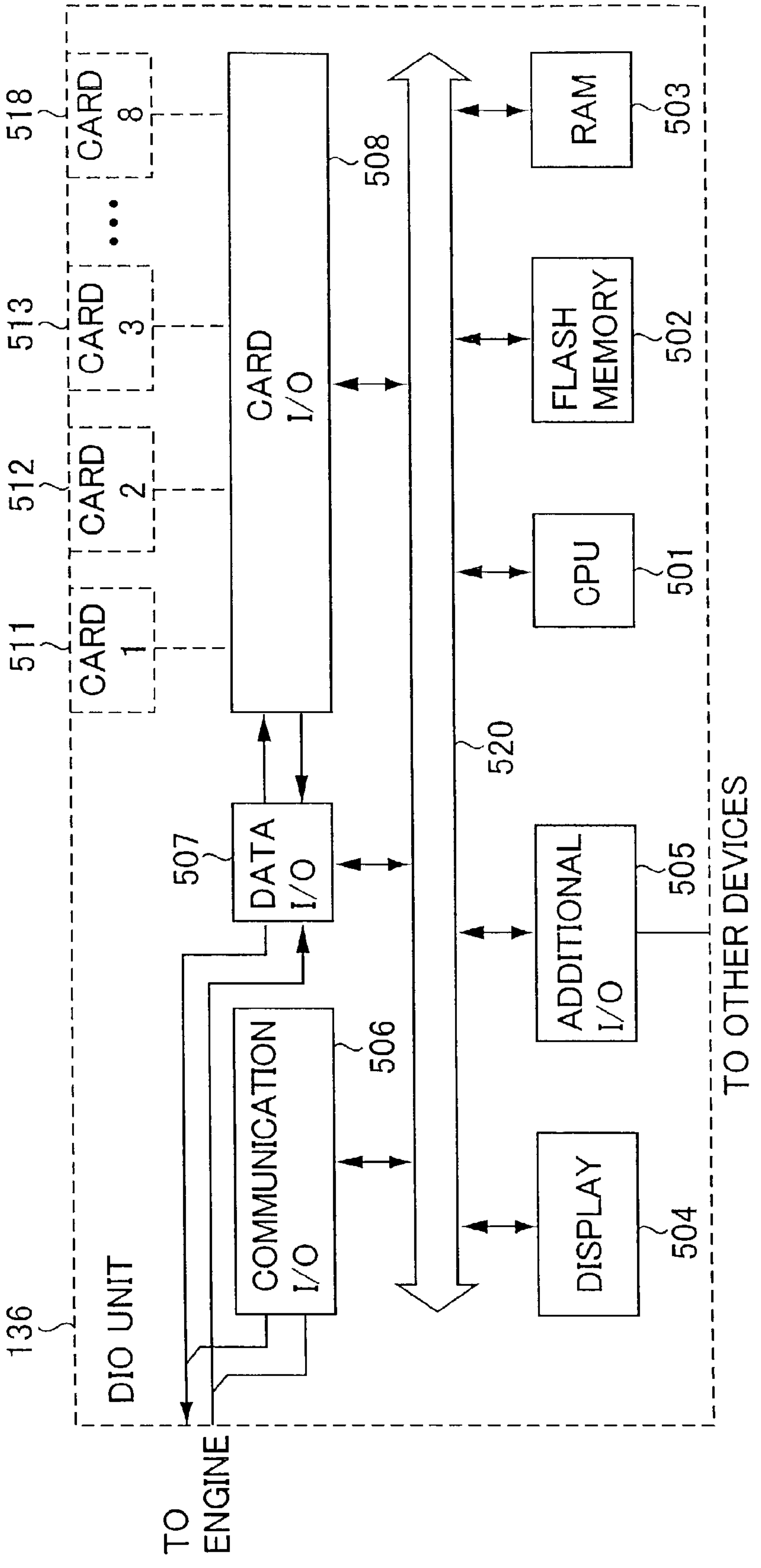
FIG. 5 is a block diagram showing an internal configuration of a DIO unit.

FIG. 5 is a block diagram showing an internal configuration of the DIO unit 136. The DIO unit 136 comprises a CPU 501, flash memory 502, RAM 503, a display 504, an additional I/O 505, a communication I/O 506, a data I/O 507, a card I/O 508, and a bus line 520.

The CPU 501 controls an overall operation of the unit. The flash memory 502 stores a control program that the CPU 501 executes. The RAM 503 is used as a work area for the CPU 501 to execute a program. The display device 504 displays an operating situation of the unit. The additional I/O 510 is an interface for connection with other devices. The data I/O 506 and the communication I/O 507 are interfaces for exchanging serial and digital data with the engine 122 and are used as terminals for connection with the engine 122 as shown in FIG. 1. The card I/O 508 is an interface for various I/O cards (equivalent to Din 608 and Dout 646 to be described later) mounted on the unit. The card I/O 508 is connected to eight connectors 511 through 518 for mounting eight cards at most. The bus line 520 connects these parts to each other.

The DIO unit 136 is an input/output unit and has two input terminals and two output terminals for connection with the engine 122. Theses terminal are time-divisionally multiplexed for control signals and sound signals. Each terminal is not duplicated and is connected to the engine in a simplex fashion, i.e., by using a single cable. The single DIO unit 136 can connect with two engines (two simplex systems) which supply outputs thereto. A specification signal, one of control signals, specifies one of the two connected engines to be a master engine. The DIO unit 136 outputs an audio signal from the master engine to an external device in a digital form. A control signal from the master engine controls operations of the DIO unit 136. The single DIO unit 136 can connect with two engines (two simplex systems) which receive inputs therefrom. The DIO unit 136 supplies both of the two connected engines with a digital input audio signal from an external device. The DIO unit 136 is controlled by a control signal from the master engine specified by a specification signal which is one of control signals. When the master engine stops supplying a control signal by malfunction or failure, the DIO unit 36 automatically receives a control signal from the other engine, i.e., a slave engine.

While there has been described the internal configuration of the DIO unit 136, the AI unit 132 and the AO unit 134 have basically the same configuration as the DIO unit 136.

The AI unit 132, an input unit, has three terminals for connection with the engine 122. These terminals are time-divisionally multiplexed for control signals and sound signals. Each terminal is not duplicated and is connected to the engine in a simplex fashion, i.e., by using a single cable. The single AI unit 132 can connect with three engines (three simplex systems) as outputs. The three connected engines are supplied with an output audio signal which is A/D-converted in an A/D conversion input card mounted on the unit. A specification signal, one of control signals, specifies one of the three connected engines to be a master engine. A control signal from the master engine controls operations of the AI unit 132. When the master engine stops supplying a control signal by failure, the AI unit 132 automatically receives a control signal from a slave engine to recover the failure.

The AO unit 134, an output unit, has three terminals for connection with the engine 122. These terminals are time-divisionally multiplexed for control signals and sound signals. The single AO unit 134 can connect with three engines (three simplex systems) as inputs. A specification signal, one of control signals, specifies one of the two connected engines to be a master engine. The AO unit 134 selectively inputs sound signals from the master engine and D/A-converts the input signal on a D/A conversion output card mounted on the unit. A control signal from the master engine controls operations of the AO unit 134. When the master engine stops supplying a control signal, the AO unit 134 automatically receives a control signal from a slave engine.

Figure 6:
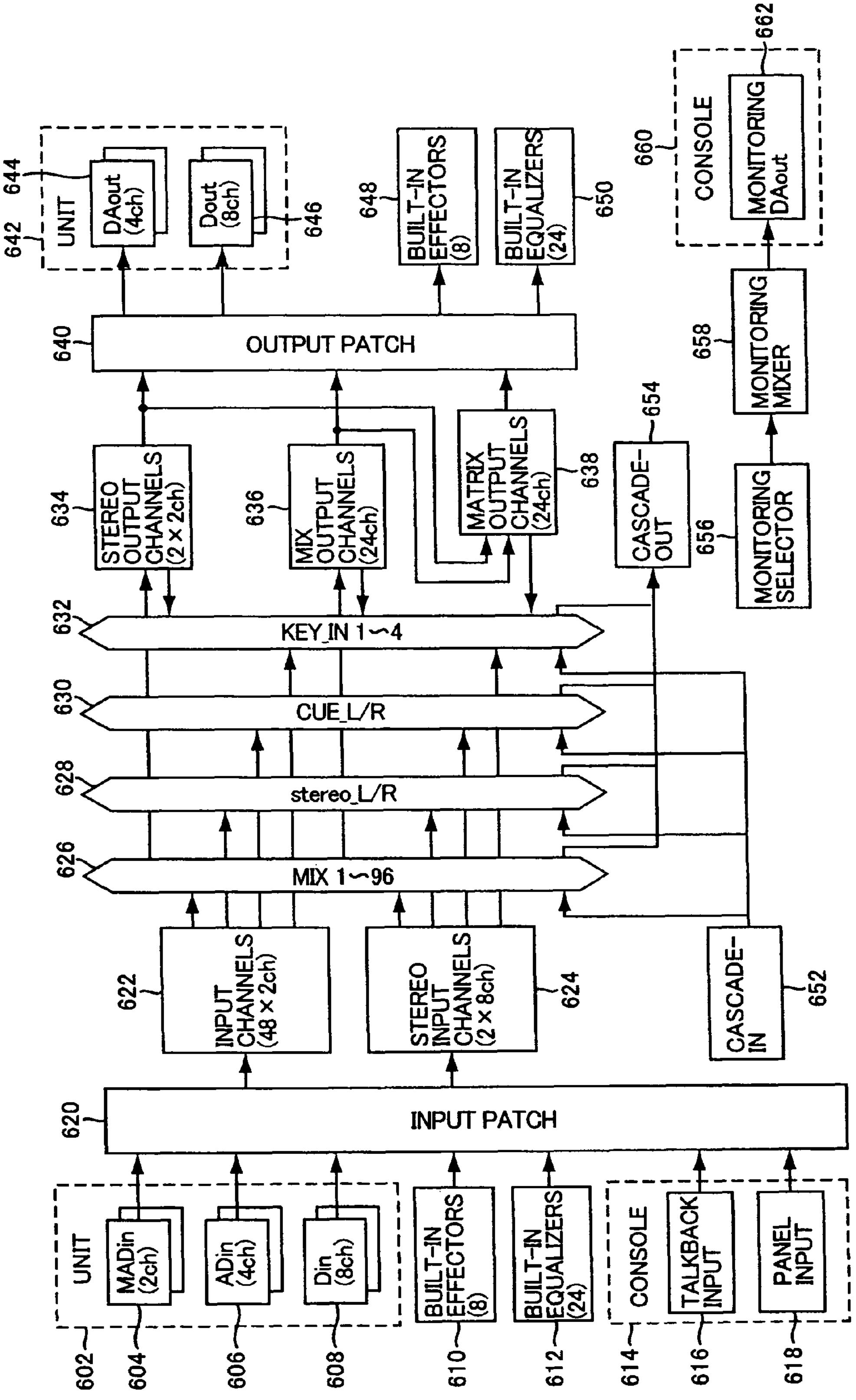
FIG. 6 is a block diagram showing a functional configuration of the digital mixer according to an embodiment.

FIG. 6 shows a functional block configuration of the digital mixer according to the embodiment with respect to its functions. The reference numerals 602 through 618 indicate inputs to a mixing process. A unit 602 functions as an input to the AI unit 132 and the DIO unit 136. The unit 602 is mounted with an MADin 604, an ADin 606, and a Din 608. The MADin 604 indicates a microphone signal input using an A/D conversion input card. The ADin 606 indicates a line signal input using an A/D conversion input card. The Din 608 indicates an input using a digital input card. As described with reference to FIG. 1, an input audio signal for the bus line 320 can be supplied by mounting the maximum number of three types of cards the MADin 604, the ADin 606, and the Din 608.

A built-in effector 610 indicates input from eight effectors contained in the digital mixer. Each effector inputs a stereo signal and outputs a stereo signal while applying thereto a selected effect. A built-in equalizer 612 indicates input from 24 equalizers contained in the digital mixer. Each equalizer inputs a single signal, equalizes it, and outputs a single signal. Here, the term "single" signifies that the signal corresponds to a single channel, not a stereo channel. A talkback input 616 on a console 614 indicates voice input by means of a headphone etc. used by a console operator for instruction or communication with the stage. A panel input 618 indicates waveform input such as an effect sound directly input to the console.

An input patch 620 is used for cable connection from up to 320 single inputs (MADin 604, ADin 606, Din 608), the built-in effector outputs (8 stereo outputs) 610, and the built-in equalizer outputs (24 single outputs) 612 to input channels (48×2 single inputs) 622 and stereo input channels (2×8 stereo inputs) 624 in variable combination. A user can freely configure the setting by viewing a display screen.

The input channel 622 is supplied with input audio signals selected by the input patch 620. Likewise, the stereo input channel 624 is supplied with input audio signals selected by the input patch 620. The input channels 622 and the stereo input channels 624 are configured similarly. A difference is that the stereo input channel 624 allows a left signal (L) and a right signal (R) of the stereo to be controlled in pairs. The input channel 622 enables selective output to one or more channels for MIX buses (48×2) 626 or a stereo bus (Stereo_L/R) 628. Likewise, the stereo input channel 624 enables selective output to one or more channels for the MIX buses 626 or the stereo bus 628. Each of the input channels 622 and the stereo input channels 624 makes it possible to independently specify a transmission level to each MIX bus 626 and the stereo bus 628. The input channels 622 and the stereo input channels 624 are also capable of selective output to a CUE_L/R bus 630 or a KEY_IN bus 632 to be described later.

The MIX buses (96 buses) 626 mix audio signals supplied from the input channel 622 or the stereo input channel 624. Mixed audio signals are output to corresponding MIX output channel 636. There is one-to-one correspondence between channels for the MIX buses 626 and the MIX output channels 636. Stereo buses (2×1) 628 mix audio signals supplied from the input channel 622 or the stereo input channel 624. Mixed stereo signals are parallel output to two stereo output channels 634. The CUE_L/R bus 630 is used to confirm what signal is input to each channel. A CUE button is provided under each channel operation device on the console panel. Turning on the CUE button enables, e.g., a headphone to hear only a signal for the corresponding channel via the bus 630. This monitoring process uses a configuration comprising devices denoted by reference numerals 656 through 662 to be described later. KEY_IN buses 632 are equivalent to four channels of single input and are used for controlling a compressor.

The stereo output channels (2×2 channels) 634 allow L and R signals of the stereo to be controlled always in pairs. An output from the stereo output channel 634 is supplied to an output patch 640 and a matrix output channel 638. MIX output channels (48 channels) 636 supply an output from the MIX bus 626 to the output patch 640 or the matrix output channel 638. It is possible to pair the (2N+1)th and (2N+2)th channels of the MIX output channels 636.

The matrix output channels (24 channels) 638 can selectively receives audio signals for one or more channels from the stereo output channels 634 and the MIX output channels 636. The matrix output channels 638 can further mix one or more selected signals. The signal processing configuration of the matrix output channels 638 is the same as that for the stereo output channels 634 and the MIX output channels 636. An output from the matrix output channel 638 is supplied to the output patch 640.

The output patch 640 is used for cable connection from the above-mentioned three types of output channels (72 single outputs plus two stereo outputs) to up to 192 single outputs (DAout 644 and Dout 646) as illustrated in unit 642, built-in effectors (eight stereo inputs) 648, and built-in equalizers (24 single inputs) 650 in any desired combination. The DAout 644 indicates output to a digital/analog conversion output card. The Dout 646 indicates output to a digital output card. An output from the output patch 640 can be supplied to the built-in effector 648 or the built-in equalizer 650.

A monitoring selector 656 is selectively supplied with one or more signals selected from the audio signals input to the stereo output channel 634, the MIX output channel 636, the matrix output channel 638, and the input patch 620. The input signal is mixed in a monitor mixer 658 and is output from a monitor DAout 662 for a console 660. The monitor mixer 658 is provided with a queue input. When any input or output specifies a queue, the monitor mixer 658 outputs a queue-specified signal instead of mixing the selected signal. According to the above-mentioned configuration, a console operator can monitor desired one of the various audio signals.

A cascade-in circuit 652 and a cascade-out circuit 654 respectively correspond to input and output for cascading engines to perform mixing operation. Namely, when engines are cascaded, the first engine's cascade-out 654 is connected to the second engine's cascade-in 652. Similarly, the second engine's cascade-out 654 is connected to the first engine's cascade-in 652. This configuration allows two engines to share buses 626 through 632.

Referring now to FIGS. 7 through 11, the following describes examples of connection between the console and the engine.

Figure 7:
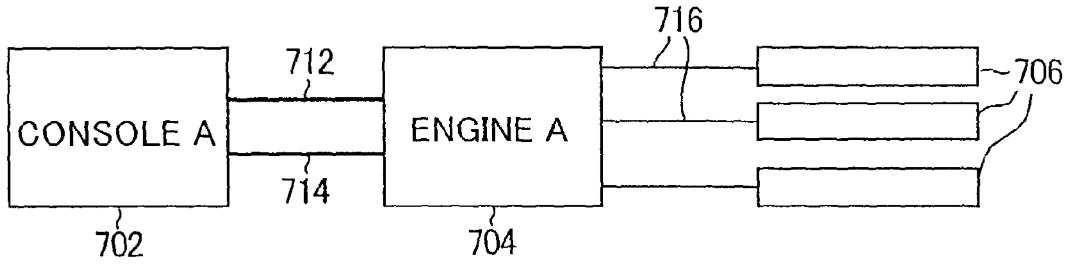
FIG. 7 shows example 1 of connecting one console and one engine.

FIG. 7 shows an example of connecting one console A702 with one engine A704. Reference numeral 712 denotes a control signal line (equivalent to the reference numeral 110 in FIG. 1). Reference numeral 714 represents a sound signal line (equivalent to the reference numeral 112 in FIG. 1). These lines 712 and 714 are duplicated. Namely, the console A702 and the engine A704 each have two connection terminals and are parallel connected through the use of two cables. In FIG. 7, duplicated lines are indicated with thick lines. The same applies to FIGS. 8 through 11 to be described later. Reference numeral 706 denotes the above-mentioned input/output units 132, 134, and 136. A simplex line (single cable) 716 is used to connect the engine A704 with each of the units 706.

Normally, one of duplicated control signal lines 712 is used to exchange control signals for control and communication. When one cable fails, it is switched to the other for continued control and communication. As a method of detecting a failure, it may be preferable to define a rule such as "sending a signal at least every X milliseconds" for example. An error can be determined when the receiving side receives no signal for Y milliseconds ($Y \geqq X$) per cable. Likewise, the duplicated sound signal lines 714 exchange sound signals as follows. Normally, one cable is used for sound signal communication. When that cable fails, it is changed to the other cable for continued sound signal communication. For providing means for detecting an error, the sound signal cable is supplied with a synchronization word clock as well as a sound signal in a time-division manner from the console to the engine or vice versa. An error can be determined when the word clock signal is interrupted or discontinued. FIGS. 8 through 12 use the same duplicated lines. The sound signal cable is based on the time division to exchange a sound signal and send a word clock for synchronization to the engine from the console or vice versa. The word clock is exchanged via the sound signal cable. According to this specification, "no occurrence of a word clock" determines "discontinuation on the sound signal line".

One engine can mix 96 input channels. One console is capable of operating 96 input channels (48 channels×2) by switching main and alternative groups. If there are many channels to be operated, the console panel cannot contain all operation devices for all the channels. Accordingly, the panel is provided with operation devices for 48 channels. There is provided an extra switch for changing the main and alternative groups. When the switch specifies the main group, an operator can use the operation devices on the panel to control the first to 48th channels. When the switch specifies the alternative group, the operator can use the operation devices on the panel to control the 49th to 96th channels.

The configuration in FIG. 7 duplicates the control signal line 712 and the sound signal line 714 between the console A702 and the engine A704, which are placed distantly from each other. If one cable malfunctions, the other cable can be used to continue processing, thereby providing a fail-safe operation. While both the control signal line 712 and the sound signal line 714 are duplicated in FIG. 7, either can be duplicated. The duplicated line improves reliability and provides a fail-safe operation.

Figure 8:
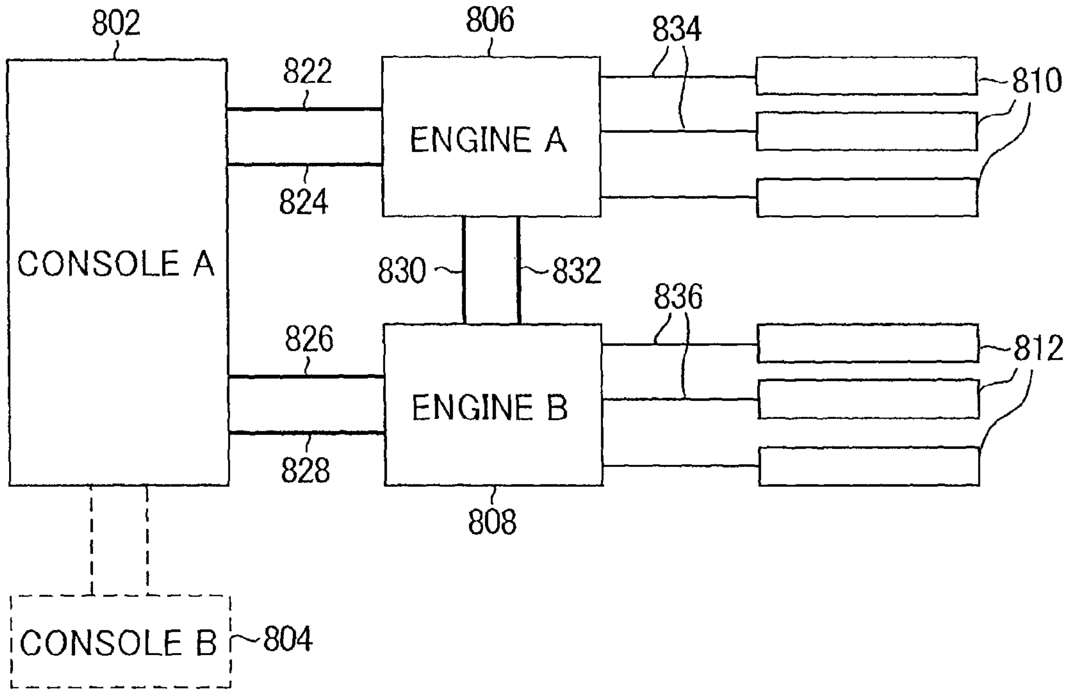
FIG. 8 shows example 2 of connecting one console and two engines.

FIG. 8 shows an example of connecting one console A802 with two engines A806 and B808. Reference numeral 822 denotes a control signal line between the console A802 and the engine A806; 824 a sound signal line between the console A802 and the engine A806; 826 a control signal line between the console A802 and the engine B808; and 828 a sound signal line between the console A802 and the engine B808. The lines 822 through 828 are duplicated. The engines A806 and B808 are cascaded by means of duplicated lines 830 and 832. Reference numerals 810 and 812 correspond to the above-mentioned input/output units 132, 134, and 136. Lines 834 and 836 each are simplex, i.e., comprise a single cable and make connection between the unit 810 and the engine A806 and between the unit 812 and the engine B808, respectively.

The cascaded two engines A806 and B808 enable mixing of 192 input channels (96 channels×2). The console A802 is capable of switching between the engines A and B and between main and alternative input channels (48 channels×2×2).

According to the configuration shown in FIG. 8, the duplicated lines can improve reliability. Adding one or more engines can increase the number of input channels for mixing.

In FIG. 8, it may be preferable to cascade a second console B804 (illustrated by the broken line) with the console A802. In this case, for example, the console A802 is basically used for switching between the engines A and B and between the main and alternative groups. When the console A802 fails, it is switched to the console B804. The console A804 is used for switching between the engines A and B and between the main and alternative groups to continue the mixing operations. Alternatively, the console A802 may be used to control the main and alternative groups for the engine A. The console B804 may be used to control the main and alternative groups for the engine B. When either console malfunctions, the other console may be used for an overall operation.

Figure 9:
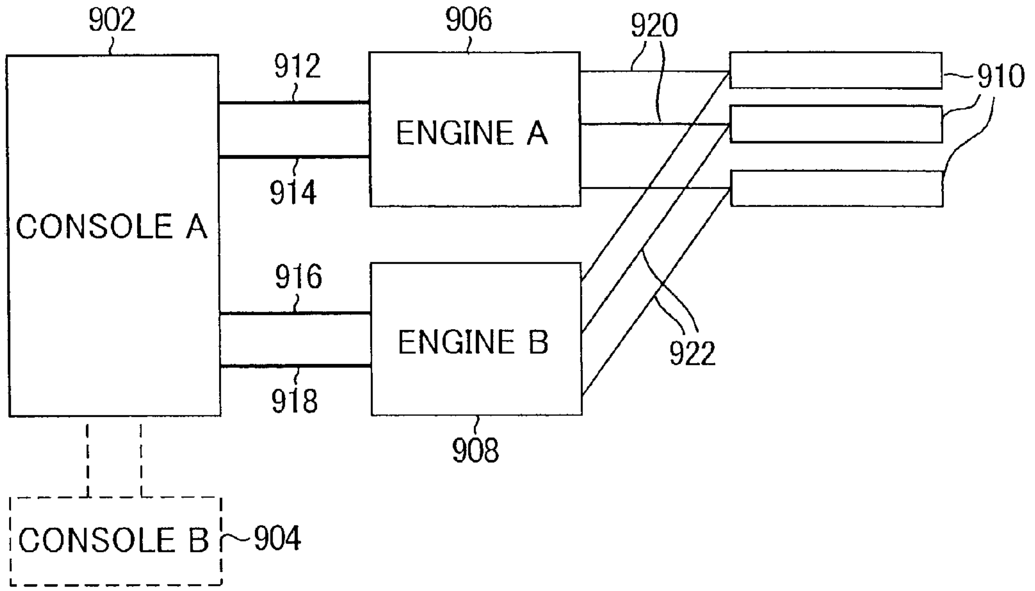
FIG. 9 shows example 3 of connecting one console and two engines.

FIG. 9 shows an example of connecting one console A902 with two engines A906 and B908, thereby providing mirroring of engines. Reference numeral 912 denotes a control signal line between the console A902 and the engine A906; 914 a sound signal line between the console A902 and the engine A906; 916 a control signal line between the console A902 and the engine B908; and 918 a sound signal line between the console A902 and the engine B908. The lines 912 through 918 are duplicated. Reference numeral 910 corresponds to the above-mentioned input/output units 132, 134, and 136. A line 920 is simplex (comprising a single cable) and makes connection between the units 910 and the engine A906. Likewise, a line 922 is simplex (comprising a single cable) and makes connection between the units 910 and the engine B908. Namely, each input/output unit is connected to two engines parallel.

The configuration in FIG. 9 enables mirroring of engines viewed from the console. Namely, the two engines A906 and B908 concurrently perform the same operation in response to control from the console A902. Normally, one engine (e.g., A906) is used as master. When the master fails, the other engine (e.g., B908) is switched to master according to the specification for continued operation. When the slave changes to the master, each output unit is configured to select and output an audio signal from the new master engine. Moreover, each input/output unit is configured to be controlled by a control signal from the new master engine. Since one engine can mix 96 input channels, the mixing process is duplicated for two engines. The duplicated processes are executed concurrently. The console A902 is used to change the main and alternative input channels (48 channels×2). Further, the console A902 is used to change the engines A and B with respect to mirroring.

The configuration of FIG. 9 also enables mirroring of engines as viewed from input units. One input unit 910 has at least two output terminals to which two lines are connected. Of the two lines, one line 920 is connected to the engine A906 and the other line 922 is connected to the engine B908. The input unit 910 outputs a digital audio signal corresponding to the input signal to both the lines 920 and 922. In response to a common control signal from the console, the two engines A906 and B908 perform the same operation. A specification signal, one of control signals, specifies one of the two engines A906 and B908. The input unit performs an operation in accordance with a control signal sent from the specified engine.

Furthermore, the configuration of FIG. 9 enables mirroring of engines viewed from output units. One output unit 910 has at least two input terminals to which two lines are connected. Of the two lines, one line 920 is connected to the engine A906 and the other line 922 is connected to the engine B908. In response to a common control signal from the consde, the two engines A906 and B908 perform the same operation. A specification signal, one of control signals, specifies one of the two engines A906 and B908. The output unit 910 receives an audio signal from the input terminal connected to the specified engine's line and outputs a musical sound signal as amplified. In addition, the output unit performs an operation in accordance with a control signal sent from the specified engine.

An indicator including the display device may be used for mirroring indication. When the specified engine is changed from one to the other, it may be preferable to allow the display device to notify this event. The input/output unit switches over to the other engine not only when the specification signal changes the master, but also when a control signal from the master engine is lost. By using the display device, a user can visually check which engine currently works as master for each input/output unit.

According to the configuration of FIG. 9, the duplicated lines can improve reliability. Because the engines are mirrored, if one engine fails, it can be promptly replaced by the other, providing a fail-safe operation. Further, adding one engine for mirroring improves reliability. If one engine fails, the other can continue mixing. While the embodiment switches the input/output units during the engine mirroring, this is not mandatory. Each engine may have a dedicated input/output unit. When the engine is changed, it may be preferable to change the corresponding input/output unit at the same time.

In FIG. 9, it may be preferable to cascade the console A902 with the second console B904 indicated by the broken line. In this case, for example, the console A902 is used for operations of changing the main and alternative channels for the mirrored engines A and B. When the console A902 fails, it is switched to the console B904. Then, the console B904 can be used for operations of changing the main and alternative channels for the mirrored engines A and B. Alternatively, the console A902 may be used for operating the main channels (the first to 48th channels) for the engines A and B. The console A904 may be used for operating the alternative channels (the 49th to 96th channels) for the engines A and B. When either console fails, the other console may be used for an overall operation.

Figure 10:
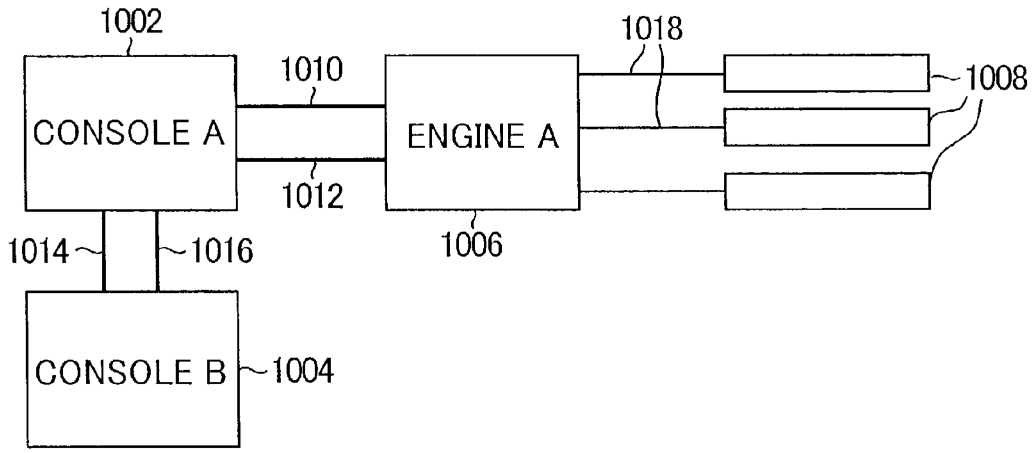
FIG. 10 shows example 4 of connecting two consoles and one engine.

FIG. 10 shows an example of connecting two consoles A1002 and B1004 with one engine A1006. The consoles A1002 and B1004 are cascaded by duplicated lines 1014 and 1016. Reference numeral 1010 denotes a control signal line between the console A1002 and the engine A1006. Reference numeral 1012 denotes a sound signal line between the console A1002 and the engine A1006. The lines 1010 and 1012 each are duplicated. Reference numeral 1008 indicates the above-mentioned input/output units 132, 134, and 136. A line 1018 is simplex (comprising a single cable) and makes connection between the units 1008 and the engine A1006.

The configuration of FIG. 10 provides console mirroring. Namely, both consoles A1002 and B1004 can control one engine A1006. Manipulation of the operation device on one console is reflected on the operation device on the other console. While the single engine A1006 is mixing 96 input channels, the consoles A1002 and B1004 each can operate the input channels (48 channels×2) by switching the main and alternative groups. Operation devices and related devices are easily subject to anomaly. If either console fails, the other console can be used for continued operation.

According to the configuration of FIG. 10, the duplicated lines can improve reliability. Because the consoles are mirrored, if one console fails, it can be promptly replaced by the other, providing a fail-safe operation. According to the configuration in FIG. 10, two consoles are serially connected to the engine. A console anomaly is chiefly caused by an operation device or an display device. The console's main circuit board hardly fails. If the console near to the engine fails, the console far from the engine can communicate with the engine by using the main circuit board of the failed console. It is also possible to design the console's main circuit board so as to enable communication even if the CPU on the main circuit board operates erratically.

The configuration of FIG. 10 can also perform an extended operation of the console. One of the two consoles can control the 48 main input channels (the first to 48th channels) of 96 input channels. The other console can control the 48 alternative input channels (the 49th to 96th channels). An operator can manually control all the 96 main and alternative channels. The capability of switching between the main and alternative channels is usable for the above-mentioned two purposes. Namely, the normal operation mode is set to, e.g., the "extended operation". When an error occurs, the operation mode can be changed to, e.g., the "mirroring operation".

Figure 11:
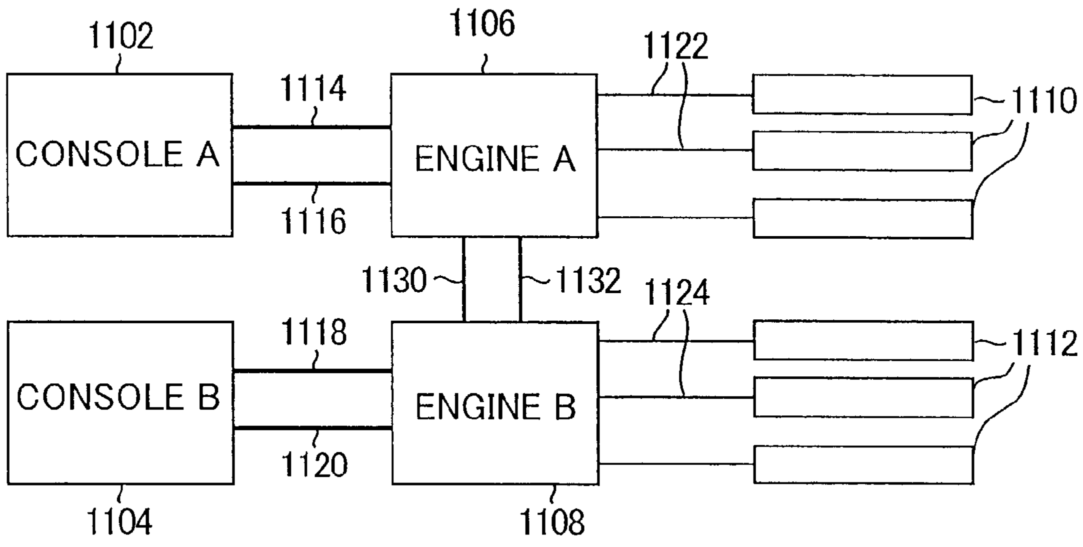
FIG. 11 shows example 5 of connecting two consoles and two engines.

FIG. 11 shows an example of connecting two consoles A1102 and B1104 with two engines A1106 and B1108. The engines A1106 an B1108 are cascaded by duplicated lines 1130 and 1132. Reference numeral 1114 represents a control signal line between the console A1102 and the engine A1106; 1116 a sound signal line between the console A1102 and the engine A1106; 1118 a control signal line between the console B1104 and the engine B1108; and 1120 a sound signal line between the console B1104 and the engine B1103. The lines 1114 through 1120 are duplicated. Reference numerals 1110 and 1112 indicate the above-mentioned input/output units 132, 134, and 136. A line 1122 is simplex (comprising a single cable) and makes connection between the unit 1110 and the engine A1106. A line 1124 is simplex (comprising a single cable) and makes connection between the unit 1112 and the engine B1108.

The two cascaded engines A1106 and B1108 can mix 192 input channels (96 channels×2). The console A1102 can operate the input channels (48 channels×2) for the engine A1106 by switching the main and alternative groups. The other console B1104 can operate the input channels (48 channels×2) for the engine B1103 by switching the main and alternative groups.

The configuration of FIG. 11 uses two engines and two consoles correspondingly. This increases the number of available input channels and promotes large-scale mixing.

Figure 12:
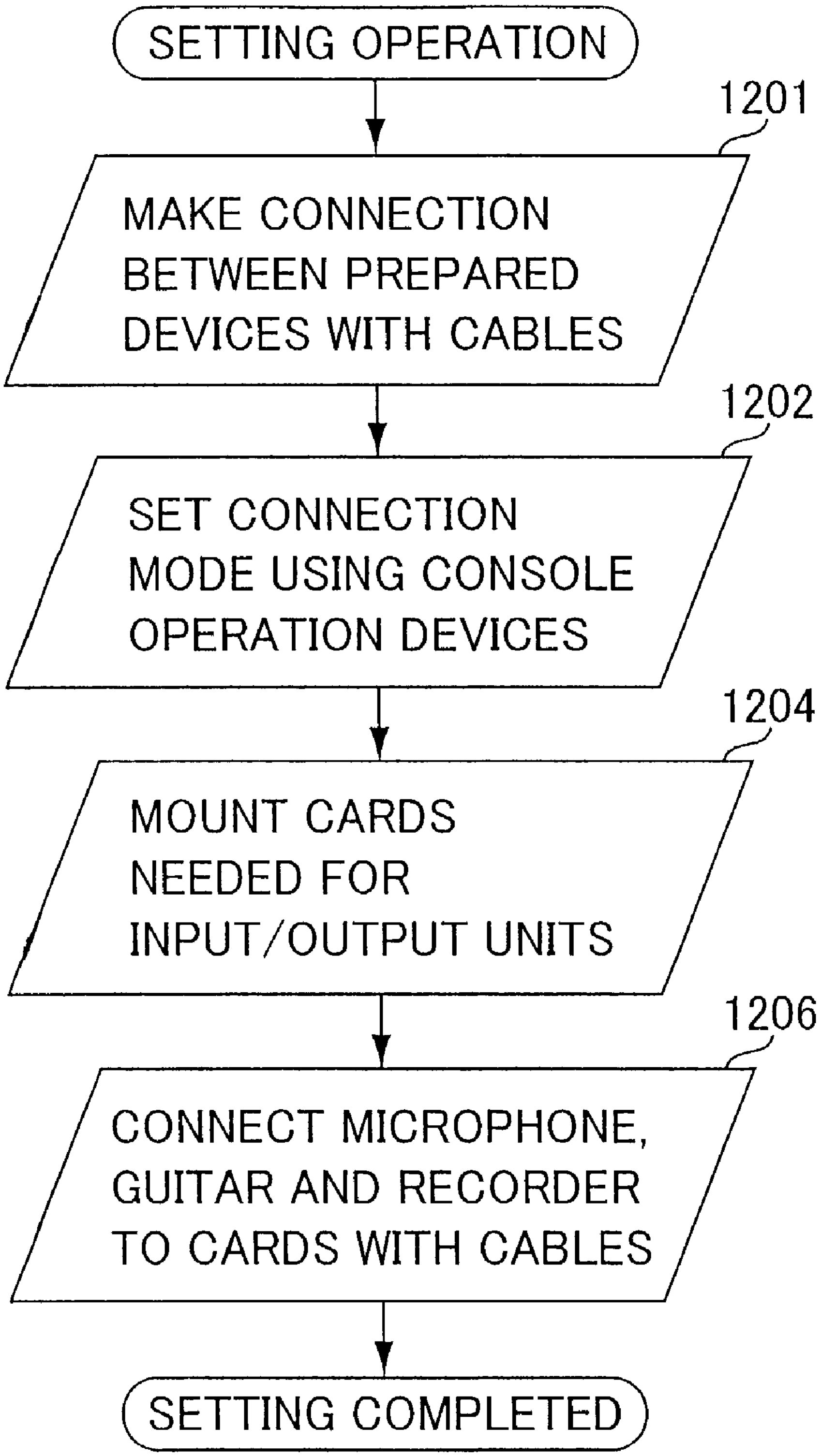
FIG. 12 is a flowchart showing a setup procedure.

FIG. 12 shows a procedure of setting the digital mixer according to the embodiment. At step 1201, a cable is used to connect between prepared devices and units according to the connection forms as shown in FIGS. 7 through 11, for example. At step 1202, a connection mode is specified by using operation devices on the console. This process selects the mode corresponding to the connection form and allows the members of the system to identify and recognize the connection form. At step 1204, a necessary card is mounted on the input/output unit. At step 1206, a microphone, a guitar, a recorder, etc. are connected to the card by means of cables. The digital mixer setup is thus completed.

Figure 13A:
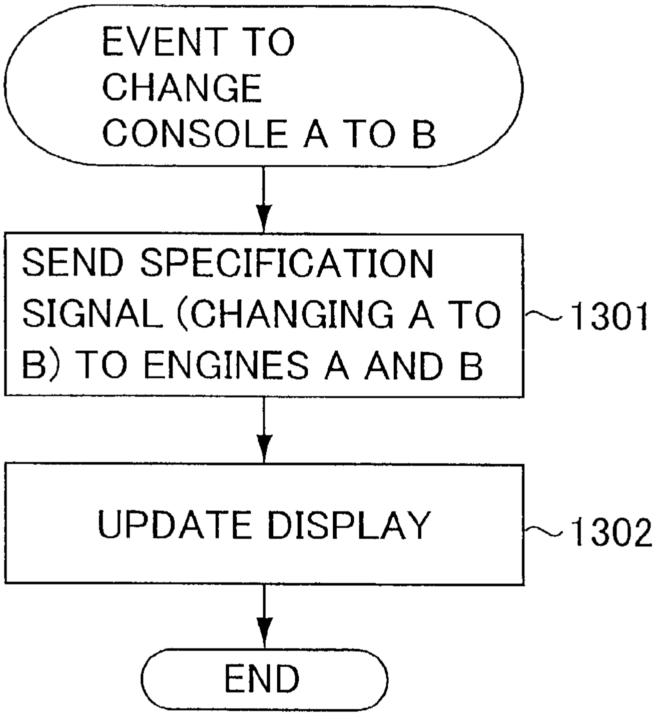
FIGS. 13(*a*) and 13(*b*) are a flowchart showing procedures for the console and the engine when a specification operation is performed for changing the master from the engine A to B.
Figure 13B:
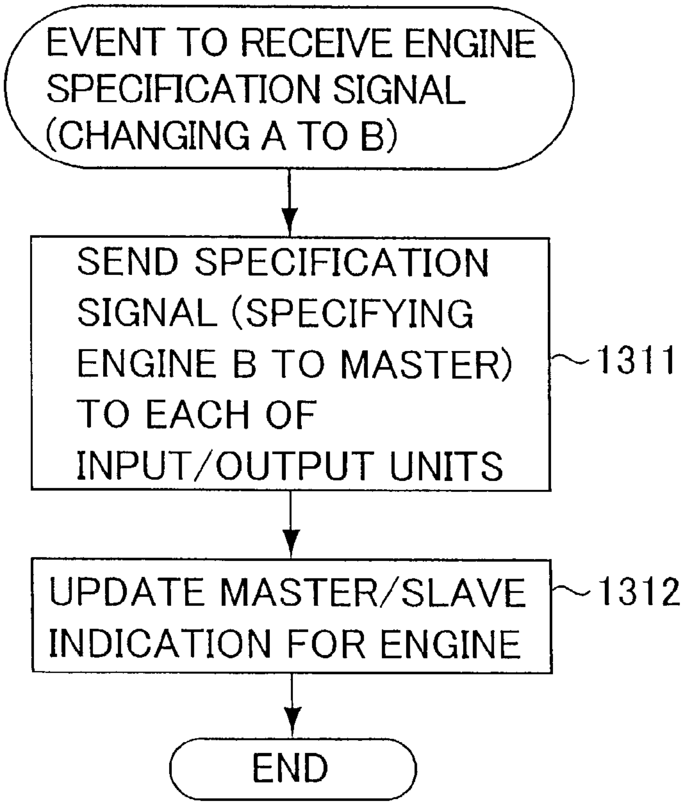

FIG. 13(*a*) shows a procedure on the console when a specification operation is performed to change the master from the engine A to B according to the connection form of example 3 (FIG. 9). At step 1301, the console A sends a specification signal, one of control signals, to the engines A and B. The specification signal changes the master from the engine A to B. At step 1302, the display is updated. The console A changes the data source for various displays on the console from the engine A to B. The indication for the master engine is changed from the engine A to B. In this example, the system is configured to generate the specification signal according to an operator's action. Upon detection of an error, the system itself may generate the specification signal and automatically change the master. Further, it may be preferable to allow an operator to configure conditions for changing the master.

FIG. 13(*b*) shows a process for the engines A and B which receive the specification signal, i.e., one of control signals issued from the console A as shown in FIG. 13(*a*). At step 1311, the specification signal is transmitted to each of the connected input/output units. The specification signal is one of control signals and directs to change the master from the engine A to B. At step 1312, the master/slave indication for the engine is updated. If the master is changed from the engine A to B, the slave engine also receives an audio signal just as the master engine receives an audio signal from the input unit. The slave engine outputs an audio signal to the output unit just as the master engine outputs an audio signal to the output unit. However, the output unit is configured to block the audio signal output from the slave engine for avoiding double sounding.

The connection between the devices is not limited to the examples described with reference to FIGS. 7 through 11. Other connection forms may be available.

When an error occurs on one of the duplicated lines, that cable is switched to the other. It may be preferable to notify a console operator of this event in any form such as generating a warning massage audibly or visually. It may be also preferable to allow that event to be confirmed on the screen if not notified. When one of two cables is used for operation, it is a good practice to always monitor whether or not the other cable is normal. This makes it possible to always ensure that a spare cable is normal.

As mentioned above, the digital mixer system according to the present invention separately comprises the console and the engine which are connected to each other through duplicated lines. If either cable malfunctions, the other cable can be used to continue the processing, thereby providing a fail-safe operation. Further, the engine and the console are mirrored. If a master apparatus malfunctions, a slave apparatus can be used to continue the processing, thereby also providing a fail-safe operation.

What is claimed is:

1. A digital mixing system comprising:

a pair of physically separated identical consoles being connected to each other and each console having a display and a plurality of operation devices wherein an operation device is for transmitting a control signal in response to an operation of the operation device by an operator; and an engine having input channels more than the plurality of operation devices of a console and output channels for mixing audio signals fed from the input channels in response to the control signal and feeding the mixed audio signals to the output channels, wherein the plurality of operation devices of both consoles is used to control the input channels, wherein an operation conducted on the operation device of one of the consoles by the operator is reflected in the other console and an operation conducted on the operation device of said other console by the operator is reflected in said one console, wherein the engine has a connection to the pair of the consoles such that the engine can receive the control signal from the respective console through the connection upon the operation of the operation device in the respective console, and wherein the engine operates to receive control signals from said one console and said other console for mixing the audio signals and to have the input channels controlled by operation of the plurality of operation devices of said one console and said other console by the operator, and wherein the engine operates, when none of the console suffers from a malfunction, to control one half of the input channels by operation of the plurality of operation devices of said one console by the operator, and to control the other half of the input channels by operation of the plurality of operation devices of said other console by the operator, and wherein the engine operates when said one console suffers from a malfunction for switching to said other console so as to receive therefrom control signals and to have all of the input channels controlled solely by operation of the plurality of operation devices of said other console by the operator while switching target of the control between said one half and said other half of the input channels, thereby continuing the mixing of the audio signals, and wherein the engine operates when said other console suffers from a malfunction for switching to said one console so as to receive therefrom control signals and to have all of the input channels controlled solely by operation of the plurality of operation devices of said one console by the operator while switching target of the control between said one half and said other half of the input channels, thereby continuing the mixing of the audio signals.

2. A digital mixing system according to claim 1, wherein each of the consoles has a cascade connection terminal for communication with the other console and a pair of control connection terminals for communication with the engine, and the engine has a pair of control connection terminals for communication with a console, and wherein a cascade cable is connected between the cascade connection terminals of the consoles, and a pair of control cables are connected parallel to each other between the control connection terminals of one of the consoles and the control connection terminals of the engine, such that the consoles and the engine use one of the control cables for exchanging control signals, and alternatively use the other of the control cables if a communication failure occurs in said one control cable so as to maintain the control communication.

3. The digital mixing system according to claim 2, wherein the consoles and the engine periodically exchange a control signal therebetween through said one control cable, and further comprising a detector that detects a communication failure when either of the consoles or the engine do not receive the control signal over a predetermined period.

4. A digital mixing system according to claim 2, wherein each of the consoles further has a pair of sound connection terminals for sound communication with the engine, and the engine further has a pair of sound connection terminals for sound communication with a console, and wherein a pair of sound cables are connected parallel to each other between the sound connection terminals of said one of the consoles and the sound connection terminals of the engine, such that the consoles and the engine use one of the sound cables for exchanging sound data, and alternatively use the other of the sound cables if a communication failure occurs in said one sound cable so as to maintain the communication, and wherein each of the consoles further has a signal input and a monitor output, and sound data input via the signal input of the consoles is transmitted from the consoles to the engine via the sound connection terminal, and sound data selected among the mixed audio data for monitoring is transmitted from the engine to the consoles via the sound connection terminal and is output via the monitor output.

5. The digital mixing system according to claim 4, wherein the consoles and the engine transmit and receive a word clock signal through said one sound cable for synchronization between the consoles and the engine in a multiplexing manner with the sound data, the digital mixing system further comprising a detector that detects the communication failure when the word clock signal discontinues between the consoles and the engine.

6. The digital mixing system according to claim 1, further comprising a section that indicates a state of connection among members of the digital mixing system including the pair of the consoles and the engine, such that each of the members recognizes the indicated state of connection and can operate in consistent with the recognized state of connection.

* * * * *